(12) United States Patent
Rochkind

(10) Patent No.: US 6,301,608 B1
(45) Date of Patent: *Oct. 9, 2001

(54) METHOD AND APPARATUS PROVIDING PERSONALIZED MAILBOX FILTERS

(75) Inventor: Mark Meier Rochkind, Morristown, NJ (US)

(73) Assignee: AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/696,548

(22) Filed: Aug. 14, 1996

(51) Int. Cl.$^7$ ........................................ G06F 15/16
(52) U.S. Cl. .................. 709/206; 709/206; 709/235; 379/93.24
(58) Field of Search .................. 395/200.36, 200.37, 395/200.3, 200.45, 200.75; 379/93.01, 93.24, 100.08; 709/206, 207, 200, 215, 245

(56) References Cited

U.S. PATENT DOCUMENTS

| | | |
|---|---|---|
| 4,766,604 | 8/1988 | Axberg . |
| 4,825,460 | 4/1989 | Carter et al. . |
| 4,932,042 | 6/1990 | Baral et al. . |
| 5,377,354 | 12/1994 | Scannell et al. . |
| 5,483,580 | 1/1996 | Brandman et al. .................. 379/88 |
| 5,588,009 | * 12/1996 | Will . |
| 5,706,211 | * 1/1998 | Beletic et al. .................. 395/200.36 |
| 5,742,763 | * 4/1998 | Jones .................. 395/200.3 |
| 5,796,394 | * 8/1998 | Wicks et al. . |

FOREIGN PATENT DOCUMENTS

| | | |
|---|---|---|
| 2159973 | 5/1996 | (CA) . |
| 0 588101A2 | 8/1993 | (EP) . |
| WO 94/06236 | 3/1994 | (WO) .......................... H04M/3/42 |
| WO 96/27160 | 9/1996 | (WO) . |

OTHER PUBLICATIONS

J.D. Gould et al., "Speech filing—An Office System for Principals", IBM Systems Journal, vol. 23, No. 1, 1984, pp. 65–81.

* cited by examiner

Primary Examiner—Zarni Maung
Assistant Examiner—Farzaneh Farahi
(74) Attorney, Agent, or Firm—Kenyon & Kenyon

(57) ABSTRACT

An electronic mailbox filters or sorts messages according to personalized or customized rules set by the owner of the mailbox through the use of address extensions. The addressee will assign an address extension to a prospective sender before the sender sends a message. The sender may use this address extension when addressing and sending a message to the addressee. The addressee can also provide a specific sender with multiple address extensions so that the sender could send messages relating to particular topics or projects. The addressee will maintain a look-up table of valid address extensions. This look-up table correlates address extensions with particular levels of priority. The addressee can change the priority associated with particular messages by reassigning the priority associated the corresponding address extension in the look-up table. Thus, even if a sender continues to use a particular address extension in the sending address, the mailbox may no longer treat such messages with the priority level expected by the sender.

26 Claims, 2 Drawing Sheets

METHOD AND APPARATUS PROVIDING PERSONALIZED MAILBOX FILTERS

BACKGROUND

The present invention relates to communication services. More specifically, the present invention relates to filtering or sorting voice, electronic text or multimedia messages stored in mailboxes according to personalized or customized rules set by the owner of each mailbox.

Electronic mailboxes are systems wherein messages between two or more parties may be communicated and stored for later retrieval by the message recipient. U.S. Pat. No. 4,932,042 issued to Baral et al., on Jun. 5, 1990 and assigned to AT&T Bell Laboratories is herein incorporated by reference. The forms of the communicated messages are virtually limitless and include audio, video, electronic text, electronic graphics and/or any combination thereof. An electronic mailbox used by a business or residence customer will collect messages of different types and of different importance to the addressee. The mailbox owners will want to know when important messages are waiting and will want to sort through and to retrieve messages by class of importance. The advent of electronic junk mail will create an intolerable situation for electronic mailboxes that do not possess filtering capabilities.

Electronic mailboxes with limited filtering capabilities are generally known. For example, some known electronic mailbox messaging services allow the addressee to maintain a list or personal directory of allowable senders' addresses. Received messages from senders whose addresses are not on the list or personal directory are screened. This type of message filtering capability, however, is very limited. The addressee cannot receive any messages, no matter how worthwhile, from any sender not listed in the personal directory. New senders can only be added to the list and have their messages received if they are known to the addressee.

Other known electronic mailbox services allow the sender to declare the priority or importance of the message when sending the message. Thus, if the sender indicates that its message is urgent, then the addressee's electronic mailbox service will play back this urgent message before non-urgent messages. This type of message filtering capability, however, does not reflect the addressee's (or mailbox owner's) priorities and can be easily abused by the sender.

European Patent EP 558 101 published on Mar. 23, 1993, discloses an electronic mailbox system that allows the addressee to prioritize messages in a limited manner based on the calling party's telephone number. Once the mailbox owner has accessed its mailbox through a personal identification number (PIN), the mailbox owner can enter the telephone numbers of known calling parties, such as a spouse or the mailbox owner's boss, to assign priority. When calling parties attempt to leave messages, their telephone numbers, identified by a network feature sometimes referred to as automatic number identification (ANI), are compared to the telephone phone numbers previously stored by the mailbox owner. In accordance with this comparison, the messages of predetermined calling parties will receive priority during message playback.

The known electronic mailboxes, however, suffer several shortcomings. Specifically, the known electronic mailboxes do not identify the specific message, but instead merely identify the telephone number from which the message originated. Thus, a high priority message will not be recognized if it originates from a location other than the sender's telephone number. This is certainly the case for voice messages. Electronic text messages can carry information in a "from" field which could identify the originator independently of the location from which the message is sent. Alternatively, a low priority message could be sent from a telephone number with a recognized, predetermined high priority; the low priority message would be filtered as a high priority message. Furthermore, the filtering capabilities of known electronic mailboxes are based on a single, fixed phone number assigned by the telephone company and identified through the ANI feature. When messages are sent from locations where ANI is not available, even this scheme is unworkable. Therefore, the known electronic mailboxes do not consider the possibility of the same caller leaving messages concerning different topics with varying priorities.

Additionally, electronic communications systems commonly allow the sender to maintain an unlisted address or phone number. With the advent of alias addresses in association with unlisted addresses or phone numbers, the sender and addressee can communicate without the addressee discovering the sender's originating address or phone number. Carriers are entrusted to use a sender's ANI for routing and billing purposes. When the ANI is an unlisted number, revealing this number to the addressee is proscribed. Therefore, using ANI as the basis for mailbox filters is problematic.

SUMMARY OF THE INVENTION

An object of the present invention is to improve upon existing electronic mailbox messaging services by providing a personalized or customized capability for electronic mailboxes to filter messages by class of importance or subject, and to put control of the filter process with the addressee.

The electronic mailbox messaging service of the present invention filters or sorts messages according to personalized or customized rules set by the owner of the mailbox through the use of address extensions. The messages can be of virtually limitless forms including audio, video, electronic text, electronic graphics and/or any combination thereof. The messaging service receives a message from the sender including an address extension. The address extension uniquely identifies the context of the message. In one example, the addressee provides specific address extensions to different senders. It is also possible that the same address extension is sometimes assigned to several senders. The messaging system can receive messages from a given sender utilizing one of a multiple of address extensions and process each address extension differently; each address extension could represent a different subject or class of importance. The messaging service correlates each address extension with a message tag within a look-up table. The message is stored with the correlated message tag. The messages are then linked with other stored messages on the basis of the message tags so that messages with the same message tag are linked. When requested by the addressee, the messaging service plays back the messages in a sequence based on the message tags.

The stored messages and correlated message tags can be stored in the sequential order that they are received by the messaging service. Messages having the same correlated message tag can be linked together as separate groups. Each group of linked messages for a specific message tag can then be linked together in an addressee-specified order.

The addressee provides senders with appropriate address extensions and maintains a look-up table of valid address extensions. This look-up table will correlate address extensions with message tags that represent particular subject groupings and levels of priority. For example, the message tags can represent the following message priorities: urgent, important, selected commercial, personal and normal. Of course, more than five classes of message priority are possible. The addressee can change the priority associated with particular messages by reassigning the priorities associated with address extensions and message tags in the look-up table. Thus, even if a sender continues to use a previously effective address extension in the sending address of the message, the mailbox may no longer treat such a message with the priority level assigned earlier. The linkage between address extensions and message tags, and between message tags and priorities is under the control of the addressee. Furthermore, the sender does not know that the addressee has changed the priority associated with the sender's message.

Alternatively, two or more look-up tables can be stored for an addressee. The different look-up tables can represent different mailbox profiles each of which may be appropriate in a particular situation. The addressee can control which look-up table is active at any moment.

The present invention thus solves many problems associated with the known electronic mailbox systems. In the present invention, the priority is assigned to the message via address extension, not the sender's phone number so that the sender can send a high priority message from any phone line and still receive high priority; similarly, a low priority message sent from another person's phone line will not receive higher priority than is appropriate.

The messaging service can also operate in conjunction with a submailbox feature where multiple subscribers utilize the same phone. Each subscriber is previously assigned a submailbox extension by which a caller can access that user's particular submailbox. The messaging service uses the submailbox extension to perform the above described processes.

Also, the present invention protects the anonymity of a sender with an unlisted address or phone number. The network acts as a surrogate by allowing the sender to define an alias address and by substituting an intercepted sender's unlisted address or phone number with an alias address. The network protects the sender's unlisted address or phone number by never revealing them to addressee.

DETAILED DESCRIPTION

Figure 1:
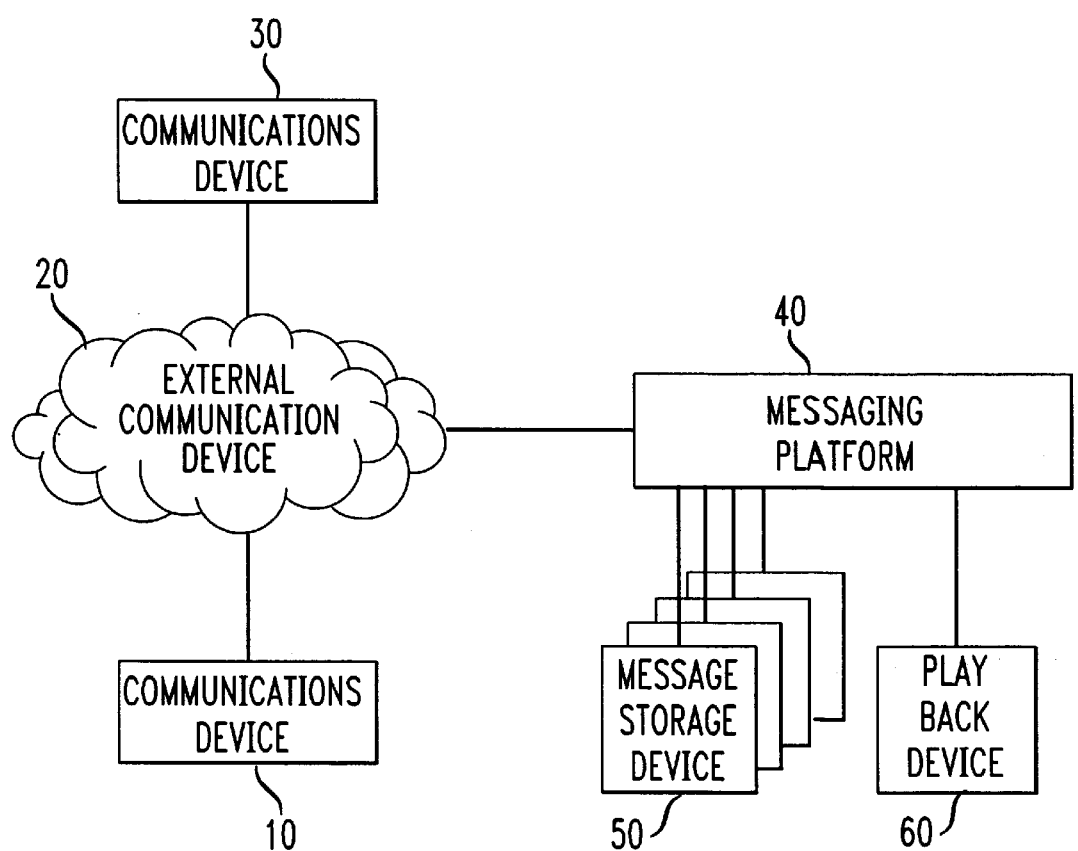
FIG. 1 shows a system block diagram of a system for providing a personalized mailbox filter to receive and filter messages.

FIG. 1 illustrates a possible system configuration for the present invention. Communications device 10, which can be any of a variety of types, such as a telephone, personal computer, etc., is connected with an external communication network 20 (e.g. the Public Switched Telephone Network— PSTN) in well-known fashion. A caller can initiate a call, for example, by dialing a desired phone number whereby conventional DTMF "touch tone" audio signals are transmitted to communication network 20. Communication network 20 detects the DTMF signals and through various switches, computer processors and software connects the communication device 10 of the caller to the communication device 30 of the desired call recipient. Although FIG. 1 shows two communication devices 10 and 30, any number of communication devices can be connected to the communication network 20. For the purposes of the following discussion, the caller is located at communication device 10 and the desired call recipient is located at communication device 30.

Messaging platform (MP) 40 provides messaging services for the desired recipient at communications device 30. Communications device 10 is connected to MP 40 via the external communication network 20. The external communication network 20 may comprise private networks, public networks or both. Communication devices 10 and 30 can be connected to the external communication network 20 through a private branch exchange (PBX), a local exchange carrier (LEC), etc. MP 40 includes the processor and software necessary to perform the messaging service of the present invention. Connected to MP 40 is at least one message storage (MS) device 50. More MS devices 50 may be necessary with an increase in the number of messaging service subscribers. Each MS device 50 includes the voice messaging databases necessary to record callers' messages and the databases to store the mailbox subscriber's preference information. Play back device 60 is also connected to MP 40. Play back device 60 comprises the software and hardware necessary to deliver a message stored in MS device 50 to addressee at communications device 30. Messaging platform 40 can cause a paging signal to be sent to a paging device to alert an addressee when appropriate.

The messaging service can be configured in a variety of ways to provide the caller and the desired recipient several ways of accessing the messaging service. The caller seeking to send a message from communication device 10 could connect to MP 40 directly, e.g., by a 1-800 phone number or a local access number, through external communication network 20. The caller would then enter the desired address with an address extension (made known to the caller by the addressee) to where the message should be delivered, leave the message, request that the message be sent and then terminate the call. MP 40 would then process the message as disclosed below in connection with FIG. 2.

Table 1 illustrates a possible format of the address and address extension. The address may comprise, for example, an optional area code (AAA) and a seven digit code (XXX-XXXX); the address extension, for example, may comprise a three digit code (EEE).

TABLE 1

| | |
|---|---|
| Address and Address Extension | AAA-XXX-XXXX-EEE |
| Address, Submailbox Address, and Address Extension | AAA-XXX-XXXX-M-EEE |

The address extension can have any number of digits and can be variously represented, e.g, by numeric characters, alphabetic characters, non-alphabetic characters, etc., or any combination thereof. An address extension consisting of numeric characters has the additional advantage of being easily recognized by standard DTMF detection techniques. Each specific sender, for example, can be assigned a separate numeric address extension.

Alternatively, each digit of an address extension can represent information by which the messages can be sorted and by which the mailbox subscriber can easily remember the address extension. For example, the first digit can represent the subject categories, such as social, business, religious, hobby, etc. type messages. A second digit can represent subgroups of each subject category, e.g,. particular business projects. A third digit can represent the message priority, e.g, urgent, important or normal.

By utilizing each digit of an address extension to represent a different type of information, granularity necessary to finely sort and prioritize messaging can be acheived. For example, the addressee may wish to play back all normal messages last, regardless of the subject category. In such a case, all messages with a normal value in the third digit are linked together and played back last. Alternatively, the addressee could link messages by more than one address extension digit. For example, the addressee may wish to play back all urgent business messages first, regardless of the particular project involved. In that case, all messages with a business value in the first digit and an urgent value in the third digit are linked together and ordered to be played back first. Thus, the address extension can provide the granularity necessary to finely sort and prioritize messaging.

In an alternative system configuration, the caller from communication device 10 could directly call the desired recipient at communication device 30 through external communication network 20. Where the call is not answered, communication network 20 could then automatically switch the call to MP 40 in well-known fashion. The caller would then enter an address extension, leave the message and then terminate the call. MP 40 would then process the message as disclosed below in connection with FIG. 2.

The messaging service can also include a submailbox feature when multiple subscribers utilize the same communication device 30. Each subscriber is previously assigned a submailbox extension by which a caller can access that user's particular submailbox. When providing the desired address to MP 40, the caller would also include a submailbox extension and an address extension. MP 40 would then process the message as disclosed in connection with FIG. 2. Table 1 illustrates a possible format for the address (AAA-XXX-XXXX), submailbox code (M), and address extension (EEE).

As an additional feature, the messaging service can protect the anonymity of a sender with an unlisted address or phone number by using the external communication network 20 as a surrogate. The network first allows the sender to define an alias address which is stored by the network in a database resident on some storage device. Each time the unlisted sender sends a message, the network then substitutes, by the appropriate software, processor and hardware, the sender's unlisted address with the sender-specified alias address. The addressee only receives the sender-specified alias address. The addressee receives the same alias address for every message sent by the particular unlisted sender. Thus, the network protects the sender's unlisted address by never revealing it to addresses while allowing the addressee to consistently recognize the sender by its alias.

Figure 2:
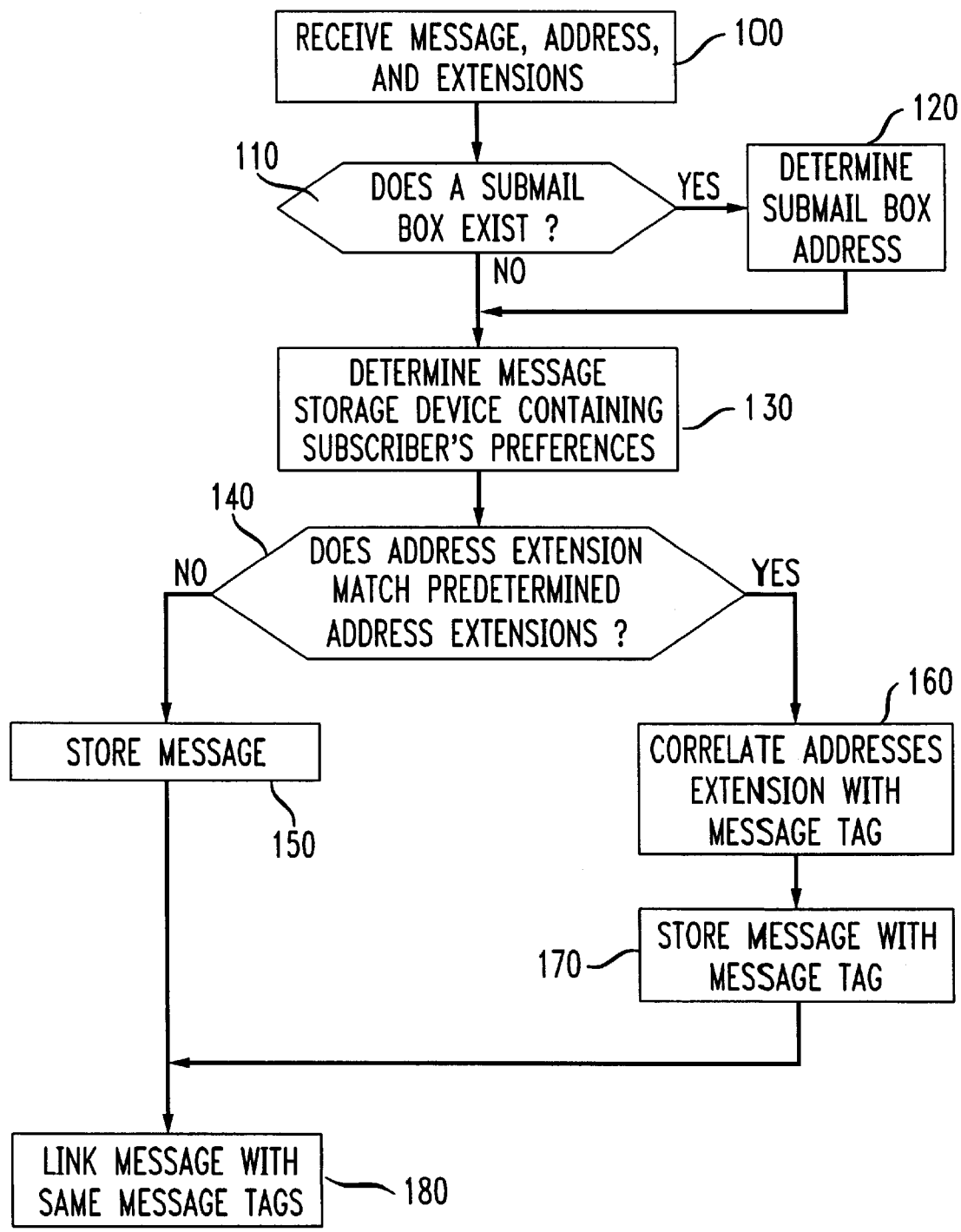
FIG. 2 shows a flowchart of an exemplary process for providing a personalized mailbox filter to receive and filter messages.

FIG. 2 illustrates the process by which MP 40 filters messages based on the received address extension. The process starts at step 100 in which MP 40 receives a message, the message address and any message extensions, possibly including a submailbox extension and an address extension. For example, messaging platform 40 can recognize whether a submailbox is indicated when address extensions comprise one digit to indicate a submailbox, three digits to indicate a message-type code or four digits to indicate a submailbox and message-type code. Next, conditional branch point 110 tests whether a submailbox exists for the received address. If a submailbox exists for the received address, then the process proceeds to step 120 in which the submailbox address corresponding to the received submailbox extension is determined. If none is supplied, the main mailbox associated with the address is used. Then the process proceeds to step 130. If a submailbox does not exist for the received address, then the process proceeds to step 130. At step 130, the message storage device corresponding to the received address, or address and submailbox address, is determined. This message storage device contains the subscriber's preferences which include the predetermined address extensions and their corresponding message tags which indicate message play back priority.

Next, conditional branch point 140 tests whether the received address extension corresponds to any predetermined address extensions. If the received address extension does not correspond to a predetermined address extension, then the message is stored as a normal message and the process proceeds to step 180. If the received address extension corresponds to a predetermined address extension, then the process proceeds to step 160 in which the message tag corresponding to the address extension is determined and the process proceeds to step 170. At step 170, the message is stored with the message tag and the process proceeds to step 180. At step 180, the message is linked with the other messages having the same message tag. Messages without a message tag are by default grouped together as normal messages. A message without a message tag is a message that was sent without an address extension or sent with an address extension that did not match any of the then current predetermined address extensions. Thus, messages sent with relevant address extensions are grouped together with other messages sent with the address extensions having the same level of priority as indicated by the correlated message tags.

The assignment of address extensions and their related message tag by the addressee to create a look-up table can be accomplished in a variety of ways. For example, the messaging service system could specify default message tag names, such as urgent, important, normal, etc., or allow the addressee to define the message tag names, such as golf club, classmates, etc., or a combination of both. The messaging service system could also allow the subscriber to assign a priority order to the message tags. For example, the addressee could assign the message groups as represented by the message tags with a descending order, such as urgent, golf club, classmates, important, normal, etc. For illustrative purposes only, Table 2 shows a possible configuration for the look-up table.

TABLE 2

| Message Tag | Address Extension | Presentation Sequence |
| --- | --- | --- |
| Urgent | 500 | 1 |
| Important | 510 | 3 |
| Normal | | 5 |
| Commercial | 530 | 9 |
| Golf Club | 121 | 6 |
| Classmates | 211 | 4 |
| Gourmet Club | 123 | 7 |
| Tennis Club | 124 | 8 |
| Classmates, Urgent | 201 | 2 |

The addressee can review and change the message tag priority or address extension assignment at any time. For example, because MP 40 has processing capabilities, an addressee can change look-up table parameters in a variety of ways. In one possible configuration where communication device 30 is a personal computer, the addressee can directly access MP 40 to modify the look-up table. In another configuration, the addressee can fax a service provisioning group associated with MP 40 who in turn can modify the look-up table. These changes could apply prospectively and/or retrospectively so that messages will be played back with the new priority order. For example, an addressee could return from an extended absence and not wish to apply the existing message tag priority or address extension assignment to the messages waiting to be heard or yet to be received. The addressee could change the message tag priorities and/or address extension assignments, and could specify a date from which these changes should apply. Thus, the previously recorded and the yet to be received messages will be filtered by the new filtering scheme.

Messages can be stored and linked in a number of ways. For example, messages can be stored sequentially as they are received and stored in steps 150 or 170. By using a pointer, the messages can be linked in step 180 so that messages with a given message tag points to the next received message with the same message tag regardless of where in the chronologically sequential list that message is stored. Each group of linked messages for a specific message tag can then be linked together in an addressee-specified order. Thus, the last linked message of the first message tag group is then linked to the first linked message of the second message tag group; the last linked message of the second message tag group is linked to the first linked message of the third message tag group; continuing to the last message tag group of messages.

It should, of course, be understood that while the present invention has been described in reference to particular applications and configurations, other arrangements should be apparent to those of ordinary skill in the art. For example, the messaging service system of the present invention can be offered in conjunction with other communication services. This implementation would merely require modifications to the external communication network 20 and the software of MP 40. As another example, MP 40 can be connected to message storage device 50 in any variety of ways, including connections via various LAN configurations.

What is claimed is:

1. A method for filtering messages from a sender to an addressee, within a communication system, comprising the steps of:
   (a) sending to the sender an address extension;
   (b) receiving a message from the sender, including said address extension that is connected with the addressee's address;
   (c) correlating the address extension with one of a plurality of message tages within a look-up table;
   (d) storing the message with the correlated message tag; and
   (e) when requested by the addressee, playing back the messages in an order based on the message tags.

2. The method of claim 1, further comprising the step of:
   (f) linking the message with other stored messages on the basis of the message tag so that messages with the same message tag are linked.

3. The method of claim 1, further comprising the steps of:
   (f) storing, when the sender has an unlisted address, an alias address assigned by the sender without the unlisted address being revealed to the addressee; and
   (g) substituting the unlisted address with the alias address stored in said step (f) before said correlating step (c) the address extension.

4. The method of claim 1, wherein said receiving step (b) receives, from the sender, a plurality of address extensions corresponding to a plurality of message subject areas.

5. The method of claim 1, further comprising the step of:
   (f) paging the addressee when the message is correlated in said correlating step (c) with a specific message tag.

6. The method of claim 1, wherein said storing step (d) stores the message and the correlated message tag in sequential order.

7. The method of claim 1, wherein said playing back step (e) plays back the messages in an order defined by a prioritization of the message tags predetermined by the addressee.

8. The method of claim 1, wherein said correlating step (c) prospectively correlates the address extension and the plurality of message tags when the addressee modifies the look-up table.

9. The method of claim 1, wherein said correlating step (c) retroactively correlates the address extension and the plurality of message tags when an addressee modifies the look-up table to be applied to messages previously received in said receiving step (b).

10. The method of claim 1, wherein said receiving step (b) receives, from the sender, a submailbox address, that is connected with the addressee's address.

11. The method of claim 1, wherein the messages are audio, video, electronic text, electronic graphics and/or any combination thereof.

12. A communication service system for filtering electronic messages from a sender to an addressee, within a communication system, comprising
   a communication network through which an address extension is sent from the addressee to the sender, and through which a message from the sender is received by the addressee, the message includes said address extension that is connected with the addressee's address;
   a processor connected to said communication network;
   a storage device connected to said processor, said storage device containing, in a look-up table, a correlation between the address extension and a message tag, and storing the message from the sender with the correlated message tag; and
   a play back device connected to said processor, said play back device, when requested by the addressee, plays back the messages stored in said storage device in the linked order determined by said processor.

13. The communication system of claim 12, wherein said processor links the message with any other stored messages on the basis of the message tag.

14. The communication service system of claim 12, wherein said communication network includes:
   a second storage device containing an alias address assigned by the sender, when the sender has an unlisted address, without the unlisted address being revealed to the addressee; and
   a second processor substituting the unlisted address with the alias address stored by said storage device.

15. The communication service system of claim 12, wherein the addressee receives, from the sender, a plurality of address extensions corresponding to a plurality of message subject areas.

16. The communication service system of claim 12, further comprising:
   a paging device, said paging device pages the addressee when the message is linked with a specific message tag.

17. The communication service system of claim 12, wherein said storage device stores the message with the correlated message tag in sequential order.

18. The communication service system of claim 12, wherein said play back device plays back the messages in an order defined by a prioritization of the message tags predetermined by the addressee.

19. The communication service system of claim 12, wherein said storage device prospectively correlates the address extension and plurality of message tags when the addressee modifies the look-up table.

20. The communication service system of claim 12, wherein said storage device retroactively correlates the address extension and the plurality of message tags when the addressee modifies the look-up table to be applied to messages previously received in said storage device.

21. The communication service system of claim 12, wherein the message includes a submailbox extension.

22. The communication service system of claim 12, wherein the messages are audio, video, electronic text, electronic graphics and/or any combination thereof.

23. A method for creating a look-up table to filter messages from a sender to an addressee, within a communication system, comprising the steps of:

(a) receiving a plurality of address extensions from the addressee, each address extension from the plurality of address extensions being provided to at least one respective sender;

(b) receiving a plurality of message tags from the addressee, each of the message tags being associated with the address extensions;

(c) receiving, from the addressee, a presentation sequence associated with each of the message tags; and (d) storing the address extensions, the message tags and the presentation sequences.

24. The method of claim 23, wherein the message tags include at least one predetermined message tag.

25. The method of claim 23, further comprising the steps of:

(e) displaying to the addressee the look-up table stored in said step (d); and (f) receiving from the addressee modifications to the look-up table.

26. The method of claim 25, further comprising the steps of:

(g) storing the look-up table modifications from said receiving step (f) as at least one separate look-up table; and (h) designating for use one of the look-up tables stored in said step (d) and said step (g) based on the addressee's selection.

* * * * *